March 24, 1942.  M. E. HANSON  2,277,045
COMBINED REFRIGERATIVE COOLING AND PRESSURE VENTILATION SYSTEMS
Filed Aug. 17, 1940
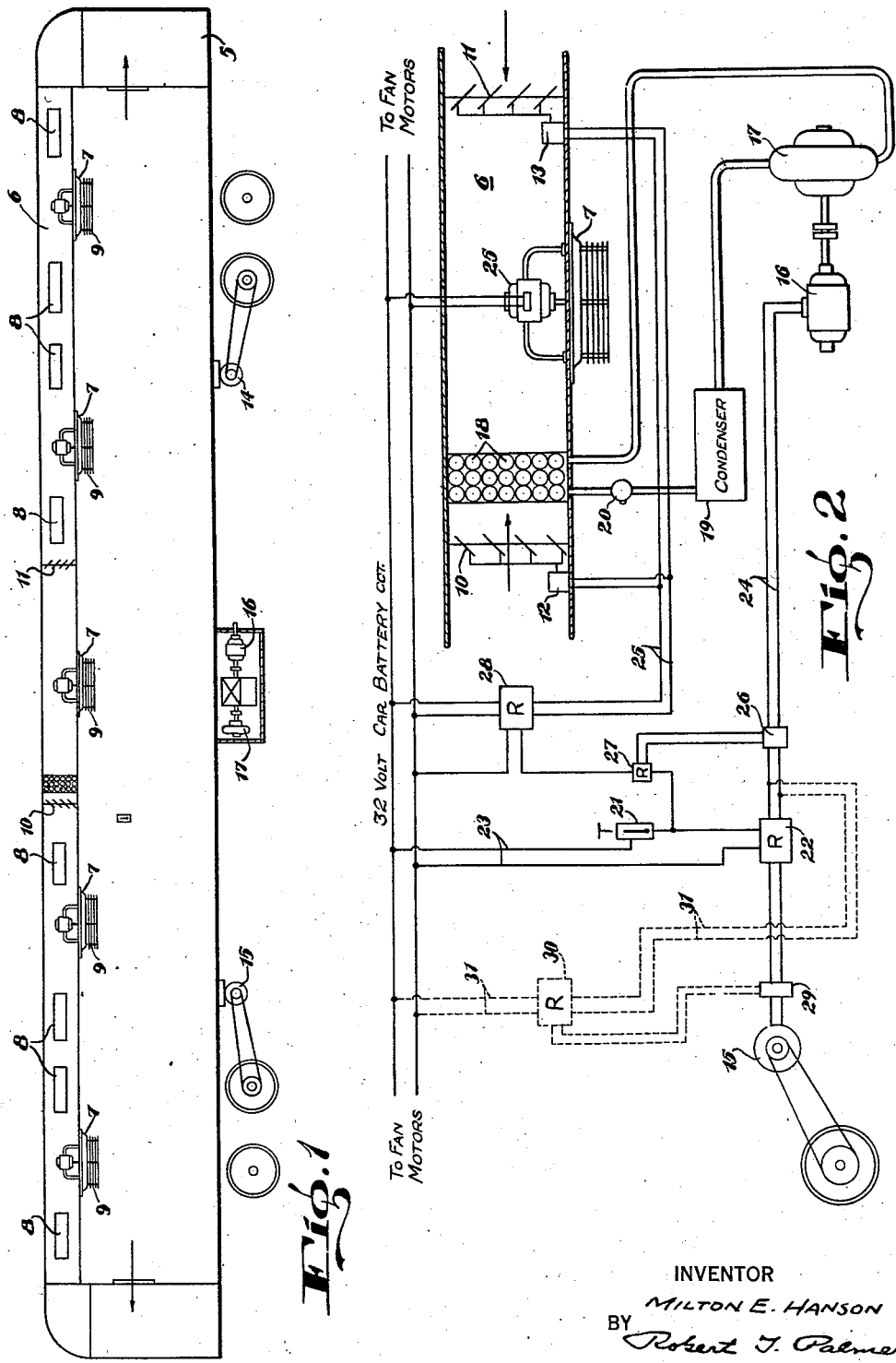
INVENTOR
MILTON E. HANSON
BY
Robert T. Palmer
ATTORNEY Patented Mar. 24, 1942

2,277,045

UNITED STATES PATENT OFFICE 2,277,045

COMBINED REFRIGERATIVE COOLING AND PRESSURE VENTILATION SYSTEM

Milton E. Hanson, Haddonfield, N. J., assignor to B. F. Sturtevant Company, Boston, Mass.

Application August 17, 1940, Serial No. 353,019

4 Claims. (Cl. 62—6)

This invention relates to refrigeration apparatus for the cooling of air and relates more particularly to refrigeration apparatus and energy supply therefor, for passenger vehicles such as railway passenger cars.

Most air conditioned railway passenger cars are equipped with special heavy duty refrigerant compressors and drives therefor for providing sufficient refrigeration for over cooling the air under peak load conditions. The costs of such systems are however, very great and it is doubted if the relatively great cost is justified.

This invention provides a system for cooling the air in a passenger vehicle which is economical considering both first cost as well as the cost of operation. The refrigeration for the system is supplied by an axle generator designed for car lighting duty and which is therefore available. Refrigerative cooling is supplemented by the supply under pressure of relatively great volumes of outdoor air.

An object of the invention is to reduce the first cost of air conditioning systems for passenger vehicles.

Another object of the invention is to reduce the operating expense of air conditioning systems for passenger vehicles.

The invention will now be described with reference to the drawing, of which:

Fig. 1 is a schematic view illustrating the application of one embodiment of the invention to a railway passenger car, and Fig. 2 is a schematic view illustrating the controls of the system of Fig. 1.

The railway passenger car 5 has the usual duct 6 in the clerestory space. The centrifugal fans 7 are mounted in apertures in the floor of the duct 6 and act to draw in outdoor air through the inlets 8 and to discharge it through the horizontal diffusers 9 into the passenger space.

The details of the fans 7 are shown by the U. S. Patent No. 2,142,834 which issued Jan. 3, 1939, on an application of C. O. Bergstrom and being readily understood by reference thereto, are not shown herein.

The dampers 10 and 11 are mounted in the duct 6 on each side of the central fan 7 and between it and inlets 8, and are adjustable by the electric motors 12 and 13 respectively to vary the volume of outdoor air drawn in by the central fan 7. The evaporator tubes 18 form an air cooler in the duct 6, between the central fan and the dampers 10.

The axle driven generator 14 is the usual 3 kw. car lighting generator. A similar 3 kw. generator 15 supplies electric energy to the electric motor 16 which drives the compressor 17. The compressor 17 supplys refrigeration through the condenser 19 and expansion valve 20 to the tubes 18.

In operation, during hot weather, if the car thermostat 21, which for example, may be set to operate at 85° F., is not satisfied, it closes an electric circuit including the relay 22, the wires 23 from the car battery circuit, the wires 24 to the compressor motor 16, and the wires 25 leading to the damper motors 12 and 13. This causes the compressor motor 16 and the damper motors 12 and 13 to operate. The motor 16 drives the compressor 17 to supply refrigeration to the tubes 18; the motor 12 adjusts the dampers 10 to partially closed position for restricting the volume of air through the tubes 18, and the motor 13 moves the dampers 11 towards closed position.

The central fan connected to the car lighting circuit thus operates to draw a limited volume of outdoor air through the tubes 18 and to supply the air chilled by the tubes into the car. During this time the other fans 7 are operating continuously to supply relatively large volumes of outdoor air into the car for providing cooling by pressure ventilation to supplement the refrigerative cooling supplied by the evaporator tubes 18.

When the car temperature falls below 85° F., the above described damper motor and compressor motor circuits open with the result that the compressor is shut down and the dampers are adjusted to wide open position to admit full capacity of outdoor air to the central fan 7 as well as to the other fans for cooling by pressure ventilation alone.

When the car speed drops below 18 miles per hour, the cut-out opens the circuit to the compressor motor 16 and to the relay 27. The relay 27 then operates the relay 28 to cause it to open the circuit connecting the damper motors to the car lighting circuit so that no drain will be placed upon the car lighting batteries if the thermostat calls for refrigerative cooling when the car is travelling too slow for the generators to be effective.

If additional batteries are placed upon the car to provide sufficient capacity to operate the refrigeration equipment during car speeds below 18 miles per hour and at short station stops, the cut-out 29 may be provided for actuating the relay 30 to close a circuit connecting the car lighting circuit through the wires 31 to supply battery current to the above described circuits so that the refrigeration equipment may be operated from the battery when the generators are not charging.

While one embodiment of the invention has been described for the purpose of illustration, it should be understood that the invention is not limited to the exact apparatus and arrangement of apparatus illustrated as modifications therefrom may be suggested by those skilled in the art without departure from the essence of the invention.

What is claimed is:

1. An air conditioning system for a passenger vehicle comprising an overhead duct connecting with outdoor air, a plurality of fans connecting through said duct with the passenger space of said vehicle, means including dampers and evaporator tubes in said duct separating one of said fans from the remainder thereof, means including a compressor for supplying refrigeration to said tubes, and means including a thermostat in said passenger space for energizing said compressor and for adjusting said dampers to decrease the volume of air passing therethrough to said one of said fans, upon an increase in temperature above a predetermined point.

2. An air conditioning system for a passenger vehicle comprising an overhead duct connecting with outdoor air, a plurality of fans connecting through said duct with the passenger space of said vehicle, means including dampers and evaporator tubes in said duct separating one of said fans from the remainder thereof, means including a compressor for supplying refrigeration to said tubes, means including a thermostat in said passenger space for energizing said compressor and for adjusting said dampers to decrease the volume of air passing therethrough to said one of said fans, upon an increase in temperature above a predetermined point, means operated through movement of the car for energizing said compressor, and means responsive to car speeds for rendering said thermostat ineffective to adjust said compressor and said dampers for low car speeds.

3. An air conditioning system for a passenger vehicle comprising an overhead duct connecting with outdoor air, a plurality of fans including a centrally located fan, connecting through said duct with the passenger space of said vehicle, dampers in said duct on one side of said centrally located fan and evaporator tubes in said duct in the other side of said centrally located fan, means including a compressor for supplying refrigeration to said tubes, and means including a thermostat in said passenger space for energizing said compressor and for adjusting said dampers to decrease the volume of air passing therethrough to said one of said fans, upon an increase in temperature above a predetermined point.

4. An air conditioning system for a passenger vehicle comprising an overhead duct connecting with outdoor air, a plurality of fans including a centrally located fan, connecting through said duct with the passenger space of said vehicle, dampers in said duct on one side of said centrally located fan and evaporator tubes in said duct in the other side of said centrally located fan, means including a compressor for supplying refrigeration to said tubes, means including a thermostat in said passenger space for energizing said compressor and for adjusting said dampers to decrease the volume of air passing therethrough to said one of said fans, upon an increase in temperature above a predetermined point, means operated through movement of the car for energizing said compressor, and means responsive to car speeds for rendering said thermostat ineffective to adjust said compressor and said dampers for low car speeds.

MILTON E. HANSON.